United States Patent
Kawakami (10) Patent No.: US 9,022,655 B2
(45) Date of Patent: May 5, 2015

(54) SIDE SEAL FOR LINEAR GUIDE APPARATUS AND LINEAR GUIDE APPARATUS

(75) Inventor: Koichi Kawakami, Hanyu (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/988,225

(22) PCT Filed: Sep. 14, 2011

(86) PCT No.: PCT/JP2011/005198
§ 371 (c)(1),
(2), (4) Date: May 17, 2013

(87) PCT Pub. No.: WO2012/066711
PCT Pub. Date: May 24, 2012

(65) Prior Publication Data
US 2013/0243355 A1   Sep. 19, 2013

(30) Foreign Application Priority Data
Nov. 19, 2010   (JP) .................. 2010-259241

(51) Int. Cl.
| F16C 33/00 | (2006.01) |
| F16J 15/32 | (2006.01) |
| F16C 33/76 | (2006.01) |
| F16C 29/06 | (2006.01) |
| F16C 29/08 | (2006.01) |

(52) U.S. Cl.
CPC .............. *F16C 33/76* (2013.01); *F16C 29/065* (2013.01); *F16C 29/086* (2013.01)

(58) Field of Classification Search
CPC ...... F16C 29/065; F16C 29/086; F16C 33/76; F16C 33/7823; F16C 33/7866
USPC ............. 384/15; 277/345, 353, 551, 562, 564
See application file for complete search history.

(56) References Cited

U.S. PATENT DOCUMENTS

| 5,553,866 A * | 9/1996 | Heinzen ................... 277/551 |
| 7,789,564 B2 * | 9/2010 | Keller et al. .................. 384/15 |
| 2008/0131036 A1 | 6/2008 | Keller et al. |

(Continued)

FOREIGN PATENT DOCUMENTS

| JP | 2006-2788 A | 1/2006 |
| JP | 2007-211900 A | 8/2007 |

(Continued)

OTHER PUBLICATIONS

Japanese-language Written Opinion (PCT/ISA/237) dated Dec. 6, 2011 (four (4) pages).

(Continued)

*Primary Examiner* — James Pilkington
(74) *Attorney, Agent, or Firm* — Crowell & Moring LLP (57) ABSTRACT

A side seal for a linear guide apparatus including a guide rail, a slider, and a plurality of rolling elements includes seal members formed of different materials, a holder plate and covers. Both seal members have recesses formed in a first face of a base and fitted with a protrusion of the holder plate. Both seal members have respective lips directed in opposite directions separated from each other. A tip of the lip of the first seal member is formed to have a shape in plane contact with the face of the guide rail. A tip of the lip of the second seal member is formed to have a shape in line contact with the face of the guide rail.

4 Claims, 6 Drawing Sheets

(56) References Cited

U.S. PATENT DOCUMENTS

2008/0131037 A1    6/2008  Keller et al.
2010/0059937 A1*  3/2010  Castleman et al. ........... 277/309
2010/0158419 A1    6/2010  Murata

FOREIGN PATENT DOCUMENTS

| | | |
|---|---|---|
| JP | 2008-133938 A | 6/2008 |
| JP | 2008-528895 A | 7/2008 |
| JP | 2008-528896 A | 7/2008 |
| WO | WO 2008/120496 A1 | 10/2008 |

OTHER PUBLICATIONS

International Search Report dated Dec. 6, 2011 with English translation (three (3) pages).
Chinese Office Action dated Feb. 8, 2014 w/ English translation (nine (9) pages).
International Preliminary Report on Patentability (PCT/IB/338 & PCT/IB/373) dated Jun. 12, 2013, (six (6) pages).
Japanese Office Action dated Aug. 26, 2014 with English translation (four pages).

* cited by examiner

PRIOR ART

SIDE SEAL FOR LINEAR GUIDE APPARATUS AND LINEAR GUIDE APPARATUS

TECHNICAL FIELD

The present invention relates to side seals fixed to both ends in a direction in which a slider constituting a linear guide apparatus moves.

BACKGROUND ART

Figure 11:
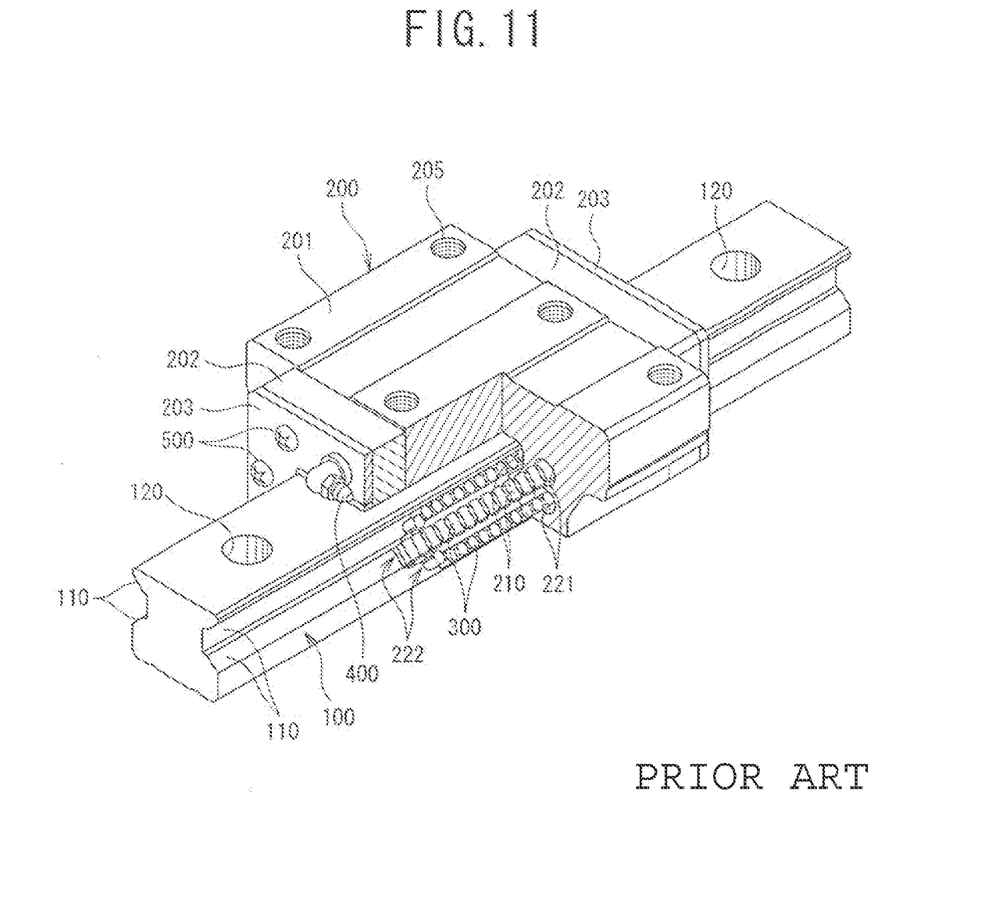
FIG. 11 is a partial exploded perspective view showing a conventional example of a linear guide apparatus.

FIG. 11 shows an example conventional linear guide apparatus. This linear guide apparatus includes a guide rail 100, a slider (also referred to a "bearing") 200, and a plurality of rollers (rolling elements) 300. The guide rails 100 and the slider 200 are disposed so as to face with each other, and have therebetween rolling grooves 110 and 210, respectively, which constitute rolling channels for the rollers 300.

The slider 200 can be divided into a slider main body 201, end caps 202 fixed to both ends thereof, and side seals 203 further attached to both ends of the slider main body in a linear-motion direction (the lengthwise direction of the guide rail 1). The rolling grooves 210 are formed in the slider main body 201. The side seals 203 disposed at both ends of the linear motion direction of the slider 102 seals spaces between the slider 200 and the top face of the guide rail 100 and both side faces thereof.

The slider 200 also includes return channels 221 for the rollers 300, and turn-over channels 222 that cause respective return channels 221 and respective rolling channels to be communicated with each other. The return channels 221 are formed in the slider main body 201, while the turn-over channels 222 are formed in each end cap 202. Female screws 205 for attaching a table, etc., by means of screws are formed in the top face of the slider 200.

Attachment holes for a grease nipple 400 are formed in the side seal 203 and the end cap 202. A lubricant is introduced to an oil path of the end cap 202 through the grease nipple 400, so that the linear guide apparatus is lubricated. The side seals 203 and the end caps 202 are attached to the slider main body 201 by bolts 500. Attachment holes 120 for enabling attachment of the guide rail 100 to a mounting object like a base by means of bolts are formed in the guide rail 100.

According to this linear guide apparatus, a circulation channel for the rolling elements is formed with the rolling channel, the return channel, and the turn-over channel The rollers 300 circulate in the circulation channel, thereby allowing any one of the guide rail 100 and the slider 200 to take a linear motion with respect to the other.

An example conventional side seal for such a linear guide apparatus has a metal plate and a base for a rubber-made seal member fixed on the metal holder plate. The lip of the seal member is brought into contact with the top face of the guide rail and both side faces thereof when in use.

Patent Document 1 discloses a technology that the holder plate (a casing) of the side seal and the seal member (a seal) with a lip (a sealing lip) are formed of different members, and a scraper is disposed so as to face the external face of the guide rail with a clearance from such an external face at the opposite side of the holder plate of the seal member. The holder plate and the seal are engaged with each other by fitting of a protrusion and a recess. According to such a side seal, relatively large foreign materials are removed by the scraper at first, and thus the sealing lip can have a longer life and an improved action.

Patent Document 2 discloses a side seal (a scraper) including two seal members having lips (sealing lips) inclined in opposite directions to each other, a piece of support plate that supports those seal members, and a housing having recesses that receive respective bases of the seal members and the support plate.

According to such a side seal, the seal members can be replaced without detaching the whole slider (the guide carriage) from the guiding rail (the guide rail) by employing the above-explained structure. The support plate employs a structure that can support the side seal without deteriorating the function as the side seal in both cases in which the support plate supports the two side seals and in which the support plate supports only one seal member formed of a flexible material.

Patent Document 3 discloses a side seal including an integrated type seal member which has a lip (a slider-side lip) directed to the slider main body and another lip (dust-side lip) directed to the opposite side and which is fixed on a metal holder plate. This side seal has both slider-side lip and dust-side lip, thereby improving both sealing performance and dust-proof performance. Moreover, Patent Document 3 discloses that a cover (a protector) for protecting the side seal from a high temperature, and foreign materials with high hardness are disposed at the outside of the side seal. A clearance is provided between the cover and the dust-side lip, so as to suppress the increase in a sealing frictional force caused by the actuation of the slider.

PRIOR ART DOCUMENTS

Patent Documents

Patent Document 1: JP 2007-211900 A
Patent Document 2: JP 2008-528895 A
Patent Document 3: JP 2008-133938 A

SUMMARY OF THE INVENTION

Problem To Be Solved

The side seals of Patent Documents 1 to 3 leave much for improvement in view of the improvement of both sealing performance and dust-proof performance and the reduction of the sealing frictional force.

It is an object of the present invention to provide a side seal for a linear guide apparatus which improves both sealing performance and dust-proof performance and which reduces a sealing frictional force.

Solution To the Problem

To solve the above problem, according to a first aspect of the present invention, there is provided a side seal for a linear guide apparatus fixed to each of both ends in an actuation direction of a slider constituting the linear guide apparatus comprising a guide rail, the slider, and a plurality of rolling elements, to seal a space between the slider and a top face of the guide rail and a space between the slider and both side faces of the guide rail, the side seal comprising: two covers each having an upper member facing the top face of the guide rail with a clearance and side members facing both side faces of the guide rail with a clearance; two seal members each having a lip in contact with the top face of the guide rail and both side faces; and a holder plate holding bases of the two seal members with an each face in a thickness direction to be held between the two covers, wherein the lips of the two seal members are directed in opposite directions (toward respective adjacent covers) to be separate from each other, and the two seal members are formed of different materials.

The linear guide apparatus has the guide rail and the slider disposed so as to face with each other and having therebetween rolling faces that form a rolling channel for the rolling elements. Any one of the guide rail and the slider takes a linear motion with respect to each other by allowing the rolling elements to roll over the rolling channel.

In the side seal for the linear guide apparatus according to the first aspect, since respective lips of the two seal members are directed in opposite directions (toward respective adjacent covers) separated from each other, the side seal improves both sealing performance and dust-proof performance. Moreover, since the two seal members are formed of different materials, the sealing frictional force can be reduced by appropriately selecting the materials of respective seal members.

In the above side seal for the linear guide apparatus, a tip of the lip of any one of the two seal members may be formed to have a shape in plane contact with a face of the guide rail, and a tip of the lip of another seal member may be formed to have a shape in line contact with a face of the guide rail. According to such a structure, the side seal can improve both sealing performance and dust-proof performance and reduce the sealing frictional force.

In the side seal for the linear guide apparatus according to the first aspect, the lips of the two seal members may be formed to have different thicknesses. According to such a structure, the side seal can improve both sealing performance and dust-proof performance and reduce the sealing frictional force.

In the side seal for the linear guide apparatus according to the first aspect, a fitting interference by the lip to the face of the guide rail may differ for each of the two seal members. According to such a structure, the side seal can improve both sealing performance and dust-proof performance and reduce the sealing frictional force.

Advantageous Effects of the Invention

According to the present invention, there is provided a side seal for a linear guide apparatus which improves both sealing performance and dust-proof performance and which reduces a sealing frictional force.

DESCRIPTION OF EMBODIMENTS

An explanation will be given of embodiments of the present invention.

Figure 1:
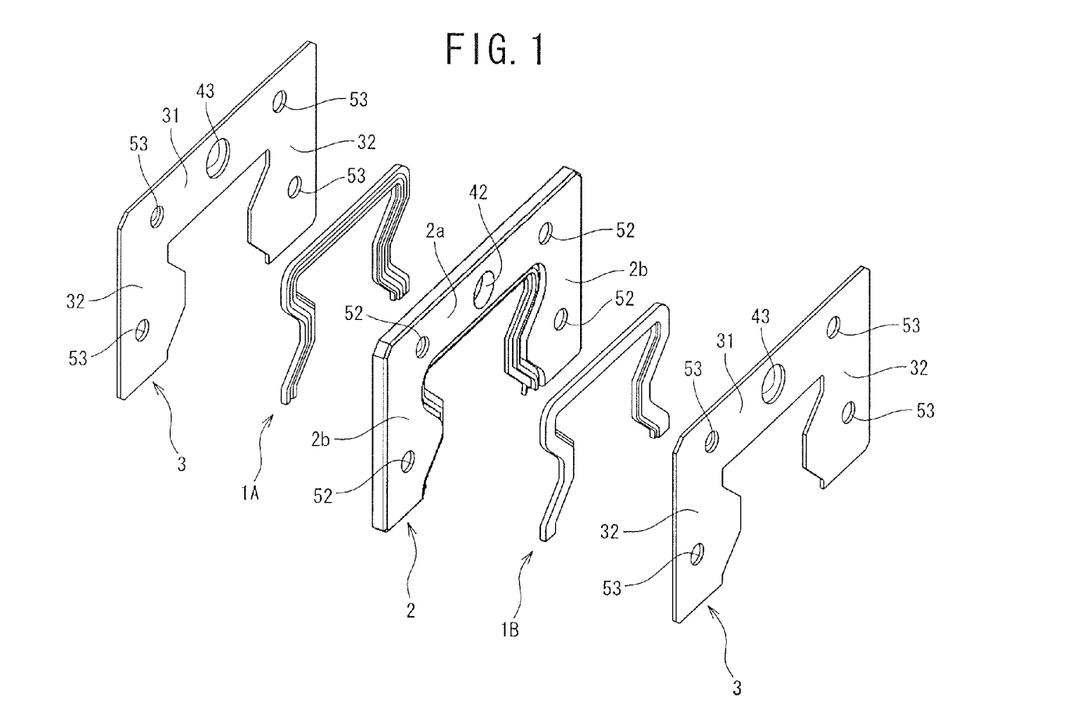
FIG. 1 is a perspective view showing two seal members a holder plate, and two covers forming a side seal according to an embodiment of the present invention.

A side seal according to the present embodiment is provided for the linear guide apparatus shown in FIG. 11, and includes, as shown in FIG. 1, two seal members 1A and 1B, a holder plate 2, and two covers 3.

Figure 2:
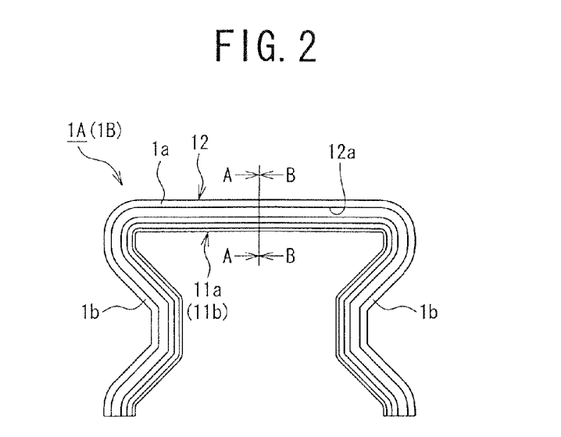
FIG. 2 is a front view showing a first seal member and a second seal member.

As shown in FIG. 2, the two side seals 1A and 1B each can be divided into an upper seal portion 1a to be disposed on the top face of the guide rail and side seal portions 1b to be disposed at the right and left of the guide rails in an arrangement as viewed from the front. Moreover, as shown in FIG. 2 and FIGS. 3A and 3B, the seal members 1A and 1B can be divided into respective lips 11a and 11b to be in contact with the top face of the guide rail and both side faces thereof in a direction in which individual seal portions 1a and 1b face with the guide rail, and respective bases 12 held by the holder plate 2.

Figure 3A:
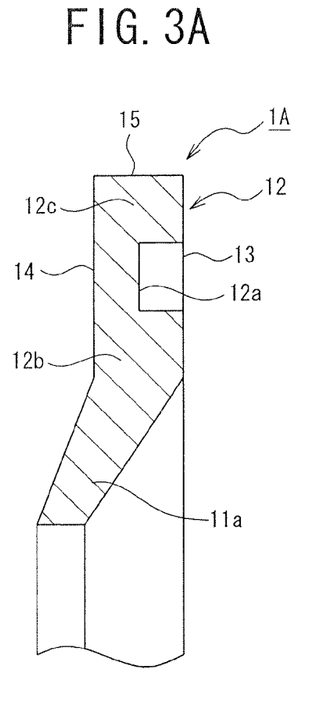
FIG. 3A is a cross-sectional view of the first seal member taken along a line A-A in FIG. 2.
Figure 3B:
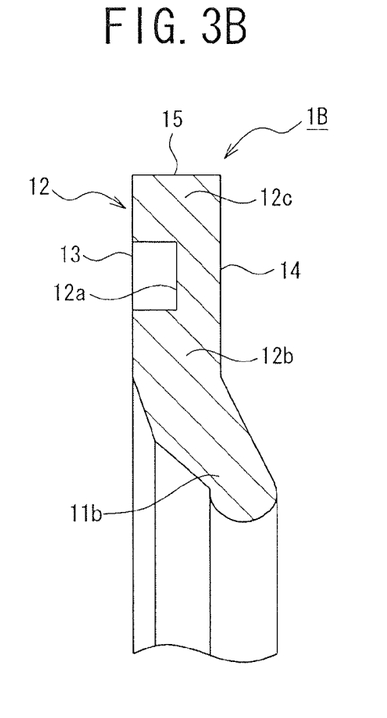
FIG. 3B is a cross-sectional view of the second seal member taken along a line B-B in FIG. 2.

The bases 12 of the seal members 1A and 1B each have, as shown in FIGS. 3A and 3B, a recess (an engaging portion engaged with the holder plate 2 by fitting of a protrusion and a recess) 12a formed in a first face 13 in the thickness direction. The recess 12a divides each base 12 into a tip 12b and a base end 12c.

Respective lips 11a and 11b of the seal members 1A and 1B are each formed at the tip 12b of the base 12, and inclined from the first face 13 side toward a second face 14 side in the thickness direction of the base 12. A third face 15 that is the outermost (a side separated from the guide rail) face of the seal member 1 is orthogonal to the first and second faces 13 and 14 of the base end 12c.

The first seal member 1A is formed of an elastic body (e.g., thermoplastic elastomer) which is not flexible and has a Young's modulus of 50 to 300 N/mm² (preferably, 100 to 200 N/mm²), and has, as shown in FIG. 3A, the lip 11a whose tip is formed to have a shape in plane contact with the top face of the guide rail and the side faces thereof. The second seal member 1B is formed of an elastic body (e.g., nitrile rubber or fluorine-containing rubber) which is flexible and has a Young's modulus of 3 to 50 N/mm² (preferably, 5 to 20 N/mm²), and has, as shown in FIG. 3B, the lip 11b whose tip is formed to have a shape in line contact with the top face of the guide rail and the side faces thereof.

Figure 4:
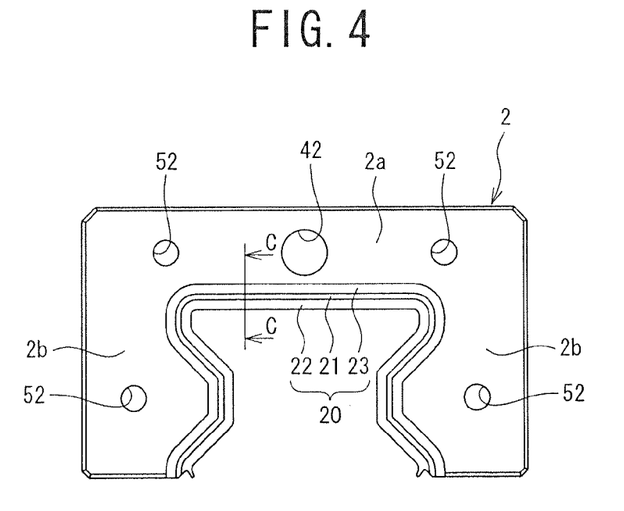
FIG. 4 is a front view showing the holder shown in FIG. 1.
Figure 5:
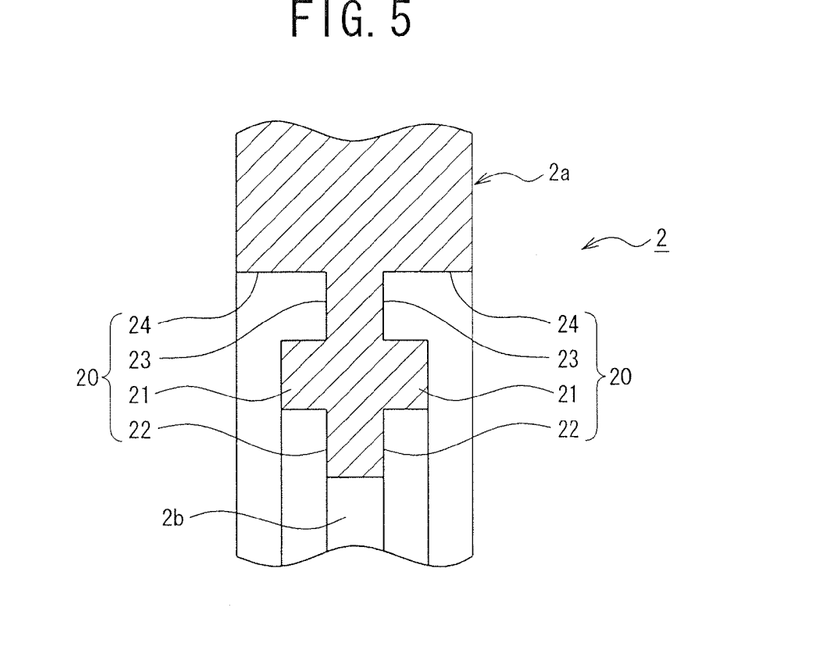
FIG. 5 is a cross-sectional view taken along a line C-C in FIG. 4.

As shown in FIG. 4 and FIG. 5, the holder plate 2 is formed to have the substantially same shape as that of the end cap 202 (see FIG. 11) constituting the slider 200 (see FIG. 11), and includes an upper portion 2a to be disposed on the top face of the guide rail 100, and side portions 2b to be disposed at the right and left sides of the guide rail 100. Formed in the upper portion 2a are through holes 52 that allow respective bolts 500 (see FIG. 11) to pass through and a through hole 42 for attaching the grease nipple 400 (see FIG. 11). The through hole 52 that allows each bolt 500 to pass through is also formed in each side portion 2b. Holding portions 20 each holding the base 12 of the seal member 1 are formed at the inside (a side toward the guide rail) of the holder plate 2.

Each holding portion 20 includes a protrusion 21 to be fitted in the recess 12a of the base 12 of the seal member 1A or 1B, a first holding face 22 formed at the inside of the protrusion 21, a second holding face 23 formed at the outside of the protrusion 21, and a third holding face 24 formed at the outside of the second holding face 23. The first holding face 22 and the second holding face 23 are in parallel with the tabular face of the holding plate 2, and the third holding face 24 is orthogonal to the tabular face of the holder plate 2.

Figure 6:
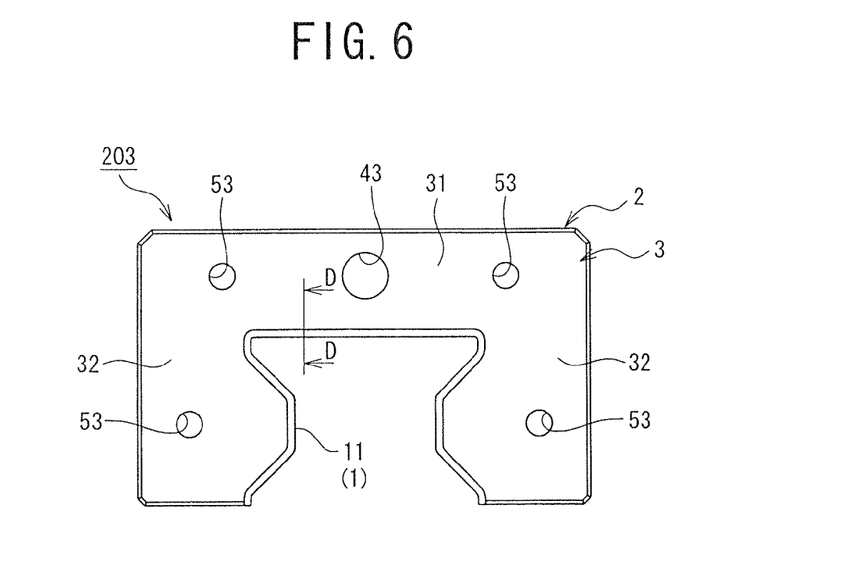
FIG. 6 is a front view showing the side seal of FIG. 1 as viewed from a cover side.

As shown in FIG. 1 and FIG. 6, the cover 3 has a face in a substantially same shape as that of the end cap 202 constituting the slider 200, and includes an upper member 31 facing with the top face of the guide rail 100 with a clearance therebetween, and side members 32 facing with the right and left side faces of the guide rail 100, respectively, with a clearance therebetween. Through holes 53 which allow respective bolts 500 to pass through, and a through hole 43 for attaching the grease nipple 400 are formed in the upper member 31. The through holes 53 which allow respective bolts 500 to pass through are also formed in respective side portions 32.

Figure 7:
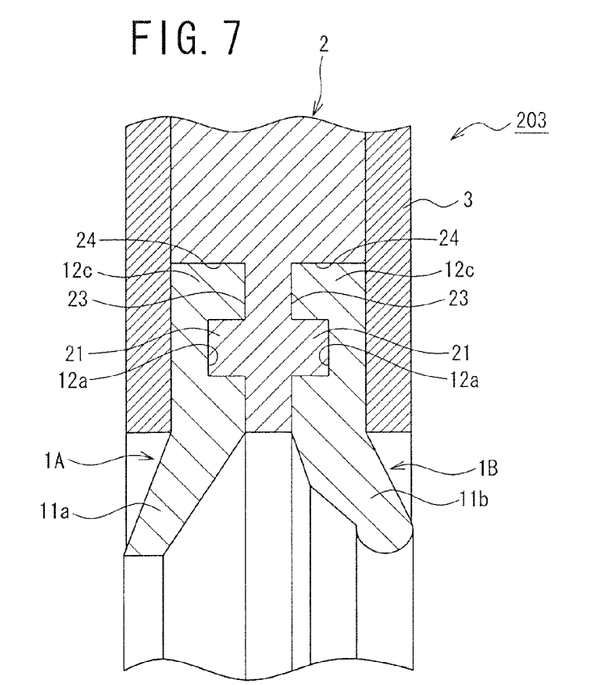
FIG. 7 is a cross-sectional view (corresponding to a cross-sectional view taken along a line D-D in FIG. 6) showing the side seal of FIG. 1.

The side seal according to the present embodiment is assembled by letting the holder plate 2 to hold the seal members 1A and 1B, and disposing the covers 3 at both sides of the holder plate 2. More specifically, as shown in FIG. 7, the recesses 12a of the bases 12 of the seal members 1A and 1B are fitted with the respective convexities 21 of the holding portions 20 of the holder plate 2, and thus the holder 2 can hold the seal members 1A and 1B. At this time, the base end 12c is fitted in a recess formed by the third holding surface 24, the second holding surface 23, and the surface of the protrusion 21 facing with the third holding face 24.

Figure 8:
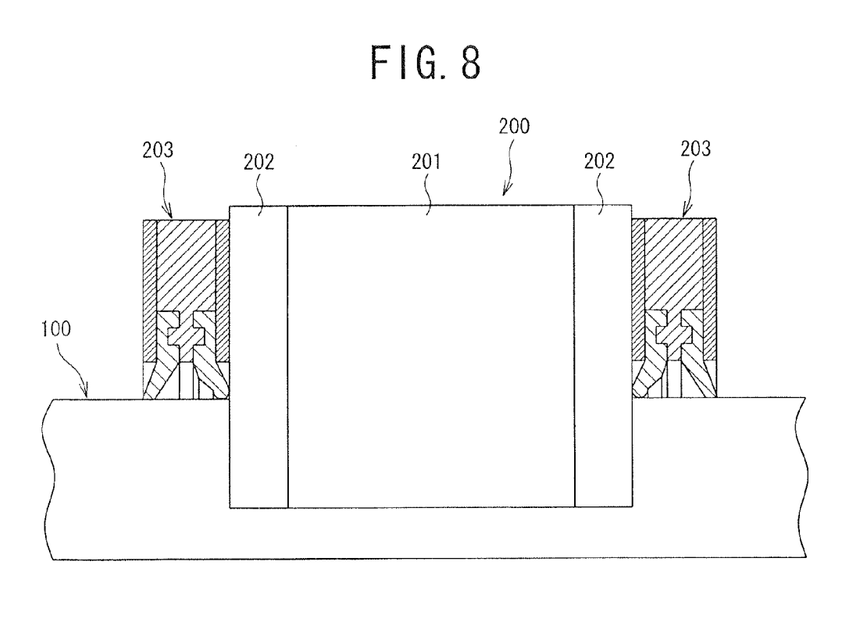
FIG. 8 is a schematic structural diagram showing an example linear guide apparatus to which the side seal of FIG. 1 is attached.

Such side seals 203 are attached to, for example, both ends of an actuation direction of the slider 200 as shown in FIG. 8.

As explained above, according to the side seal according to the present embodiment, respective lips 11a and 11b of the two seal members 1A and 1B are directed in the opposite directions separated from each other (directed toward respective adjoining covers 3). Hence, the side seal according to the present embodiment improves both sealing performance and dust-proof performance. Moreover, appropriate selection of respective materials of the seal members 1A and 1B reduces the sealing frictional force. Furthermore, the lip 11a of the first seal member 1A has a tip formed to have a shape in plane contact with the guide rail and the lip 11b of the second seal member 1B has a tip formed to have a shape in line contact with the guide rail. Accordingly, the side seal is excellent in both sealing performance and dust-proof performance, and reduces the sealing frictional force.

Figure 9:
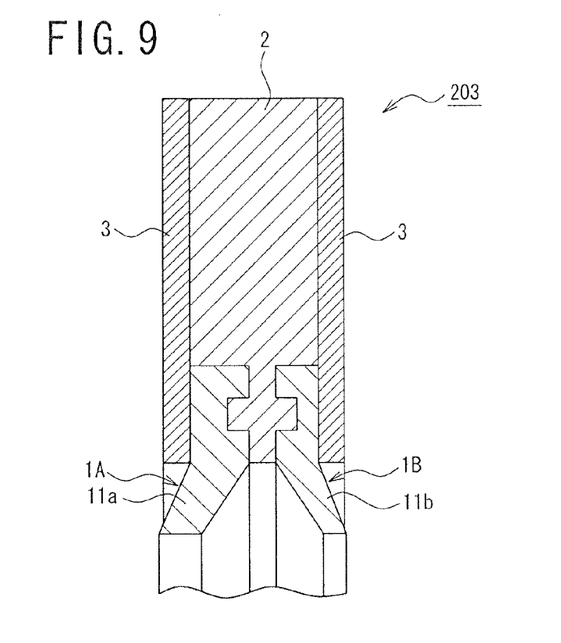
FIG. 9 is a cross-sectional view (corresponding to a cross-sectional view taken along a line D-D in FIG. 6) showing an example side seal having a seal member in a different shape from that of FIG. 1.
Figure 10:
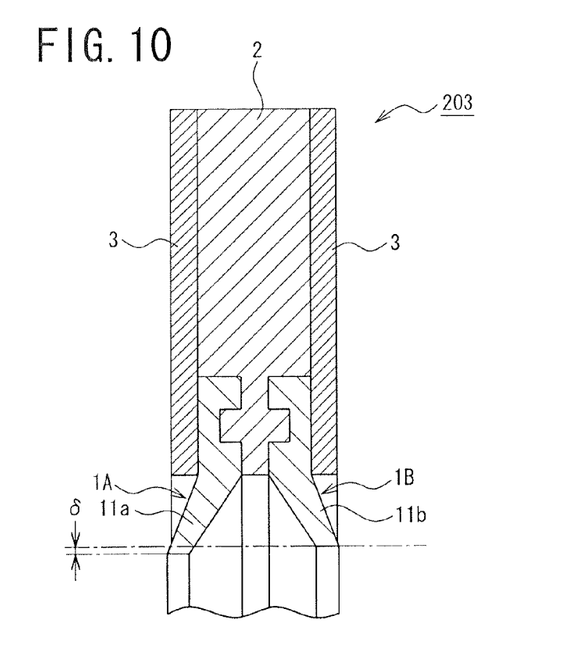
FIG. 10 is a cross-sectional view (corresponding to a cross-sectional view taken along a line D-D in FIG. 6) showing an example side seal having a seal member in a different shape from that of FIG. 1.

A side seal according to another embodiment is shown in cross-sectional views (corresponding to a cross-sectional view taken along a line D-D in FIG. 6) of FIG. 9 and FIG. 10. A side seal 203 shown in FIG. 9 has a lip 11a of the first seal member 1A and a lip 11b of the second seal member 1B both to have a shape in plane contact with the guide rail, and has the first seal member 1A thicker than the second seal member 1B. In the example shown in FIG. 9, the first seal member 1A is formed of an elastic body (e.g., thermoplastic elastomer) which is not flexible and has a Young's modulus of 50 to 300 N/mm² (preferably, 100 to 200 N/mm²), and the second seal member 1B is formed of a material (e.g., nitrile rubber or fluorine-containing rubber) which is flexible and has a Young's modulus of 3 to 50 N/mm² (preferably, 5 to 20 N/mm²). Hence, a side seal can be obtained which improves both sealing performance and dust-proof performance and which reduces the sealing frictional force.

A side seal 203 shown in FIG. 10 has a lip 11a of the first seal member 1A and a lip 11b of the second seal member 1B both to have a shape in plane contact with the guide rail, and the first seal member and the second seal member have the same thickness. Moreover, a fitting interference by the lip 11a of the first seal member 1A is set to be larger than a fitting interference by the lip 11b of the second seal member 1B by δ. In the example shown in FIG. 10, the first seal member 1A is formed of an elastic body (e.g., thermoplastic elastomer) which is not flexible and has a Young's modulus of 50 to 300 N/mm² (preferably, 100 to 200 N/mm²), and the second seal member 1B is formed of a material (e.g., nitrile rubber or fluorine-containing rubber) which is flexible and has a Young's modulus of 3 to 50 N/mm² (preferably, 5 to 20 N/mm²). According to this structure, also, a side seal can be obtained which improves both sealing performance and dust-proof performance and which reduces the sealing frictional force.

As a material for the first seal member 1A and the second seal member 1B, a synthetic rubber or a thermoplastic elastomer containing a self-lubricating material can be used. Moreover, any one of the first seal member 1A and the second seal member 1B may be formed of a material of another side seal containing a self-lubricating material so that the first and second seal member can be formed of different materials.

REFERENCE SIGNS LIST

1A First seal member
1B Second seal member
1a Upper seal portion
1b Side seal portion
11a Lip of first seal member
11b Lip of second seal member
12 Base
12a Recess of base
12b Tip of base
12c Base end
13 First face of base
14 Second face of base
15 Third face of base
2 Holder plate
2a Upper portion of holder plate
2b Side portion of holder plate
20 Holding portion
21 Convexity
22 First holding face
23 Second holding face
24 Third holding face
3 Cover
31 Upper member of cover
32 Side member of cover
42 Through hole for attaching grease nipple
43 Through hole for attaching grease nipple
52 Through hole that allow bolt to pass through
53 Through hole that allow bolt to pass through
100 Guide rail
110 Rolling surface of guide rail
200 Slider
201 Slider main body
202 End cap
203 Side seal
205 Female screw
210 Rolling surface of slider
221 Return channel
222 Turn-over channel
300 Roller (rolling element)

400 Grease nipple
500 Bolt

The invention claimed is:

1. A side seal for a linear guide apparatus fixed to one of both ends in an actuation direction of a slider constituting the linear guide apparatus comprising a guide rail, the slider, and a plurality of rolling elements, to seal a space between the slider and a top face of the guide rail and a space between the slider and both side faces of the guide rail, the side seal comprising:
   two covers each having an upper member facing the top face of the guide rail with a clearance and side members facing both side faces of the guide rail with a clearance;
   a first seal member having a first lip in contact with the top face of the guide rail and both side faces;
   a second seal member having a second lip in contact with the top face of the guide rail and both side faces; and
   a holder plate holding bases of the first and the second seal members between the two covers, wherein
   the first and the second lip are directed in opposite directions to be separate from each other, and the first and the second seal members are formed of different materials, and
   the first lip, a first tip of which is formed to have a shape in line contact with the face of the guide rail, is thicker than the second lip, a second tip of which is formed to have a shape in plane contact with the face of the guide rail.

2. The side seal for the linear guide apparatus according to claim 1, wherein a fitting interference by the lip to the face of the guide rail differs for each of the two seal members.

3. A linear guide apparatus comprising the side seal according to claim 1 attached to one of both ends in an actuation direction of the slider.

4. The side seal for the linear guide apparatus according to claim 1, wherein the first tip of the first lip of the seal member is formed to have a curved shape in line contact with the face of the guide rail.

* * * * *